3,182,026
HOMOGENEOUS PIGMENTED PEROXIDE COMPOSITIONS
Newton G. Leveskis, Richmond, Calif., assignor to U.S. Peroxygen Corporation, Richmond, Calif.
No Drawing. Filed Mar. 14, 1962, Ser. No. 179,788
14 Claims. (Cl. 252—430)

This invention relates to pigmented organic peroxide compositions. More particularly it relates to pigmented organic peroxide compositions which have been made permanently homogeneous.

The essence of the present invention lies in the combination of pigmented peroxide compositions with certain substances in order to make the total composition substantially permanently homogeneous and prevent them from physically separating into their component parts during storage or use.

In a preferred embodiment the present compositions comprise an intermixture of an organic peroxide, a compatible pigment therefor, and an activated gel in an amount sufficient to cause the composition to be permanently homogeneous. The foregoing composition may include other substances such as plasticizers depending upon the utility contemplated for the composition.

The more prevalent commercial use of organic peroxides is in the resin field where the peroxides are employed as free radical catalysts. The preparation and use of pigmented peroxide compositions is analogous to the use of the unpigmented variety and is generally described in copending patent application Serial No. 129,-522, filed August 7, 1961.

As pointed out in said copending application, the pigmentation material which is added to the organic peroxide is an organic or inorganic compound having a distinctive color. Generally the pigments have heretofore been used for diverse purposes such as dyes for fabrics, color bases for paints, and the like. When combined with a peroxide, the purposes of the pigment are several. Two of the more significant ones relate to the manner of using the compositions as polymerization catalysts. Thus the coloration in a peroxide composition enables the user of the composition to determine when the peroxide has been adequately dispersed in the medium to which it has been added by observing the distribution of the color therein. Further, the coloration in the peroxide composition may be selected so as to color the polymerized product itself with the desired hue.

The present compositions are consonant with the description and teachings of said copending application generally, with respect to the peroxides, the pigments, and the details of combining them. However, the present invention seeks to overcome one disadvantageous property of such pigmented peroxide compositions. It has been observed that a composition comprising an organic peroxide and a pigment, and which may also contain other desirable ingredients such as plasticizers, tends to separate during storage and/or use into phases or layers wherein each of the phases or layers contains one or several of the pure components of the composition.

It is a principal object of the present invention to modify pigmented peroxide compositions of the type described and disclosed in said copending application so as to substantially eliminate the separation of the composition into its components. Broadly, this object is accomplished by incorporating an activated gel into the composition. It has been discovered that the incorporation of conventional detergents or gelable colloids into the composition produces the desired product provided that the gel has been suitably activated.

More specifically, the gel may be formed from one or more of the broad class of materials known as detergents. As used herein, the term "detergents" is meant to include synthetic surfactants such as the nonionics like the polyglycol ethers which include such materials as nonyl phenol, dodecyl phenol, trimethyl nonanol, the alykyl phenol ether of polyethylene glycol, polyalkylene glycol ethers in general and the like. The term also includes the ionic detergents such as sodium heptadecyl sulfate, sodium di(2-ethyl hexyl) phosphate, sodium tetradecyl sulfate, sodium di(2-ethyl hexyl) sulfate, and the like. Suitable detergents also include materials commonly referred to as soaps which are the salts of long chain fatty acids like the zinc, aluminum, magnesium, or sodium salts of stearic acid, lauric acid, and the like.

Instead of a detergent as noted above, it is equally permissible to employ a gel-forming colloid such as precipitated finely divided silica, alkyl cellulose such as methyl cellulose, polyvinyl alcohol, pectin, egg albumen, water souble resins such as the carboxy vinyl polymers, and the like.

The present invention is further based upon the discovery that the gel, from whatever material formed, must be activated in order to properly perform its function of homogenizing and preventing separation of the components of the composition. In this respect the gel-forming agent is suitably activated by the incorporation of water or an organic polar compound having at least one hydroxyl group. These organic compounds thus include such material as the lower alkanols such as methyl alcohol, ethyl alcohol, propyl alcohol, butyl alcohol, and the like, as well as polyols such as ethylene glyco, dipropylene glycol, and the polyethylene glycols in general. Aromatic compounds such as the phenols and alkanol substituted aromatics may be similarly employed.

It is noted that in some instances there is an overlap between materials which are suitably used for their gel-forming properties and those which are used as activating agents. For example, polyvanyl alcohol is a suitable gel-forming material and by virtue of its hydroxyl groups, it is also a suitable organic polar activating agent. In this area of overlap it is necessary to select a material different from and other than the gel-forming material to serve as the activating agent. In other words where polyvinyl alcohol, for example, is used as the gel-forming material, a substance other than polyvinyl alcohol should be used as an activating agent.

The remaining components of the composition are similar to those disclosed in said copending application. Thus plasticizers such as the alkyl phthalates and other esters like butyl benzoate, dibutyl fumarate, di-octyl adipate, tricresyl phosphate, the various polyesters known in the art and mixtures thereof, and other similar plasticizer materials are suitably employed.

In the preferred compositions a plasticizer is employed since it provides a composition best adapted for the principal areas of its utility. In addition the plasticizer serves to make the composition a more efficient catalyst when used for such purposes since the plasticizer generally imparts greater solubility of the composition in the material sought to be polymerized.

The present compositions contain as the principal active ingredient an organic peroxide. Any aromatic or aliphatic organic peroxide may be used for this purpose. These materials thus include symmetrical peroxides of the diacyl and dialkyl type, hydroperoxides, peracids, and the various aldehyde and ketone peroxides. Preferably the organic peroxide selected is an aroyl peroxide or a fatty acid peroxide. Examples of suitable peroxides include benzoyl peroxide, 2,4-dichloro-benzoyl peroxide, di-tertiary butyl peroxide, perphthalic acid, cumene hydroperoxide, and the like.

As discussed in said copending application, the present compositions include a compatible pigment. A compatible pigment is defined (along with tests for its selection) in said application as one that forms a stable composition, i.e., the active oxygen content of the peroxide remains substantially constant or in any event is not adversely affected by the pigment. Suitable examples of pigments include zinc oxide, red iron oxide, black iron oxide, yellow iron oxide, metal-free phthalocyanine, ferric ferrocyanide, titanium dioxide, barytes, chrome orange, as well as materials referred to as vat dyes such as amine-free anthroquinone derivatives.

The pigment is combined in the composition in a relatively minor amount usually just sufficient to impart color to the extent desired in the composition. While there are generally no limits to the amount, in general it is preferred that the pigment be combined with respect to the peroxide in an amount by weight from about 1–25% and most suitably between about 5–15%.

The essential ingredients, i.e., the peroxide, the pigment, the gel-forming agent and its activator polar compound, are combined by any suitable technique known in the art for accomplishing a blend or intermixture thereof. Similarly, if plasticizers or other ingredients are to be combined in the mixture, they are likewise handled. The order of addition is not critical.

The amounts of each component to be present in the final composition may vary over a wide range and will depend upon the consistency of the final composition that is desired. The presence of greater or lesser quantities of water, plasticizer, and pigments will impart the obvious resulting properties in the final composition. The following table is provided as a guide in selecting suitable quantities of the principal components which may be incorporated in the composition.

Table III

| Component: | Percent by weight |
|---|---|
| Benzoyl peroxide+pigment | 20–60 |
| Water | 7–25 |
| Detergent | 5–15 |
| Plasticizer | Balance |

The following examples are offered to illustrate the method of preparation of compositions within the scope of the present invention and to demonstrate their advantageous homogeneous or non-separating properties.

EXAMPLE I 420 lbs. of butyl benzyl phthalate, 1120 lbs. of benzoyl peroxide, and 108 lbs. of water were added to a kneading machine and mixed.

155 lbs. of a polyalkylene glycol ether nonionic detergent (Tergitol XD, Union Carbide Chemicals Co., New York 17, N.Y.), 241 lbs. water, 55 lbs. of zinc stearate, and sufficient butyl benzyl phthalate to make the composition 50% benzoyl peroxide were added and mixed. The concentration of the peroxide was determined by iodometric techniques.

A portion of the final mass was placed in a 16 x 125 mm. test tube in an amount sufficient to half fill the tube. The tube was spun on a Clay-Adams Safety Head centrifuge at a setting of 3.5 for 10 minutes. No separation of the components was observed and a uniform or homogeneous mass persisted.

100 grams of the material prepared in the first paragraph were removed and 5 grams of iron oxide red (pure kroma red) were mixed therein. The material was again centrifuged as in the second paragraph. Again no separation was observed and the mass remained uniform and homogeneous.

EXAMPLE II 420 lbs. of butyl benzyl phthalate, 1120 lbs. of benzoyl peroxide and 108 lbs. of water were added to a kneading machine and thoroughly mixed. Following this, 155 lbs. of a polyglycol ether (Tergitol XD, Union Carbide Chemical Co., New York 17, N.Y.), 55 lbs. of zinc stearate and sufficient butyl benzyl phthalate to make a composition containing 55% peroxide were added. The material was centrifuged as in Example I. No separation was observed with the composition remaining homogeneous.

Table I
SUITABLE PERCENT BY WEIGHT OF PRINCIPAL COMPONENTS

| | Gel-forming agent | Plasticizer | Organic peroxide | Compatible pigment | Water or polar activating agent | | |
|---|---|---|---|---|---|---|---|
| | | | | | Detergent gel | | Non-detergent gel |
| | | | | | Water activator | Non-water activator | |
| With plasticizer incorporated | a 1%–80%<br>b 6%–30% | 6%–80%<br>20%–60% | 5%–70%<br>20%–60% | >1%–50%<br>>1%–15% | a 2%–70%<br>b 5%–30% | .25%–40%<br>1%–10% | a .001–70%<br>b .003–30% |
| Without plasticizer incorporated | a 1%–80%<br>b 6%–30% | | 5%–70%<br>20%–60% | >1%–50%<br>>1%–15% | 30%–80%<br>30%–60% | | | a Generally suitable range.
b Preferred or optimum range.

The following Tables II and III illustrate more specifically two preferred compositions.

Table II

| Component: | Percent by weight |
|---|---|
| Benzoyl peroxide+pigment | 20–60 |
| Water or hydroxy compound | .001–.3 |
| Finely divided silica | 5–10 |
| Plasticizer | Balance |

100 grams of the above material were taken and mixed with 10 grams of black iron oxide. The material was centrifuged as above. No separation was observed with the material remaining homogeneous.

In the above two examples it should be noted that a combination of detergents was employed as the gel-forming agent. The present invention contemplates the mixture of groups of suitable materials for any of the purposes for which they are employed. Thus in a similar manner water may be used in combination with an organic hydroxy compound as an activating agent. Combinations of plasticizers may be used and so forth.

EXAMPLE III 550 lbs. of a mixture of benzoyl peroxide and tricresyl phosphate (54.1% peroxide) was placed under vacuum for 36 hours in a kneading machine and 29.5 inches of mercury at a temperature of 40° C. Finely divided silica (Cab-O-Sil, Godfrey L. Cabot, Inc., Boston, Mass.) was added in an amount so as to constitute 6% of the mixture, and the materials mixed for one hour. A plurality of 16 x 125 mm. test tubes were filled half full with the above mixture. One tube was centrifuged in a Clay-Adams Safety Head centrifuge for 10 minutes at a setting of 3.5. Separation occurred with a volume of clear fluid measuring 6 mm. forming above the solid.

For comparison the remaining tubes were altered with the addition of various activating agents as noted, centrifuged as above and observed. Where separation occurred the amount of separation is noted.

| Activating agent | Amount, grams per 100 grams with thorough mixing | Number of mm. of separation after 10 minute spin |
| --- | --- | --- |
| Water | .03 | >.1 |
| Do | .05 | None |
| Do | 3.00 | 2.0 |
| Dipropylene glycol | .05 | >.1 |
| Do | .08 | None |
| Do | 2.00 | 1.0 |
| Ethylene glycol | .05 | None |
| 2-ethyl-1,3 Hexanediol | .08 | .3 |
| Ethoxytriglycol | .08 | .2 |
| Diacetone alcohol | .08 | .2 |
| Polypropylene glycol, mol. weight 425 | .08 | None |
| Polypropylene glycol, mol. weight 1025 | .08 | >.1 |
| Methanol | .08 | None |
| Butanol | .08 | .2 |
| Polyethylene glycol, mol. weight 200 | .08 | None |
| Polyethylene glycol, mol. weight 400 | .08 | >.1 |
| Anhydrous diethylether | .08 | 6.0 |
| Dibutyl ether | .08 | 6.0 |
| Anhydrous carbon tetrachloride | .08 | 6.0 |
| Anhydrous methylene chloride | .08 | 6.0 |
| Dibutyl Cellosolve | .08 | 6.0 |
| Butyl Cellosolve | .08 | .2 |
| Dibutyl phthalate | .08 | 6.0 |
| Polyalkylene glycol ether XD[1] | .08 | None |
| Polyalkylene glycol ether XH[1] | .08 | None |
| Nonyl phenol ether of ethylene oxide polymer NPX[1] | .08 | None |
| Dibutyl carbitol | .08 | 6.0 |
| 50%-50% by weight mixture of water and dipropylene glycol | .08 | None |

[1] Tergitol detergents made by Union Carbide Chemicals Company, New York 17, N.Y.

EXAMPLE IV

This example illustrates the homogeneous character of the composition with the use of various pigments when a properly activated gelling agent is employed.

1000 gram samples of vacuum dried material prepared as in Example III with silica were taken. 50 grams of various pigments were blended therewith. The materials were centrifuged as in Example III with and without further additives having been blended therewith as indicated.

| Pigment | Additive | Amount of separation observed, mm. |
| --- | --- | --- |
| Red iron oxide | No additive | 7 |
| | .08 g. water | None |
| Black Iron oxide | No additive | 7 |
| | .08 g. dipropylene Glycol | None |
| C.P. non-bronze blue | No additive | 6 |
| | Tergitol .08 g. XD | None |
| Chrome green | No additive | 7 |
| | Methanol .08 g | None |
| C.P. soft EX green | No additive | 7 |
| | .08 g. ethanol | None |
| Chrome orange | No additive | 7 |
| | .08 g. diacetone alcohol | >.1 |
| Cadmium yellow | No additive | 7 |
| | .08 g. butyl cellulose | .1 |
| Ultra marine blue lake non-aniline cosmetic blue | No additive | 7 |
| | Krom Fax solvent .08 g. HOC$_2$H$_4$SC$_2$H$_4$OH | >.1 |
| Non-aniline cosmetic green | No additive | 7 |
| | Castor oil 1 g | .1 |

EXAMPLE V

This example illustrates the homogeneous character of compositions employing various plasticizers and further demonstrates the necessity of activating the homogeneous gel.

7 kg. of commercial benzoyl peroxide (98% benzoyl peroxide) was placed in an oven under vacuum at a temperature of 40° C. and at 29.5 inches of mercury for one week. From this material pastes were prepared with seven different plasticizers. The plasticizers were also first vacuumed in order to remove any small amounts of water present.

Compositions including 50% benzoyl peroxide, the plasticizers noted, and 6% Cab-O-Sil colloidal silica were prepared by mixing. Dipropylene glycol in the amounts listed was added with mixing to the compositions.

| Plasticizer | Dipropylene glycol activator/ kg., g. | Amount of separation observed, mm. |
| --- | --- | --- |
| Di-octyl adipate | None | 9 |
| | 1 | 1 |
| Di-butyl phthalate | None | 6 |
| | .08 | None |
| Di-butyl fumarate | None | 8 |
| | 1 | None |
| Di-methyl phthalate | None | 6 |
| | .08 | None |
| Di-octyl isophthalate | None | 6 |
| | .08 | None |

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A pigmented peroxide composition consisting essentially of a water-free intermixture of an organic peroxide, a pigment with which the active oxygen content of said peroxide remains substantially constant, and an activated gel in an amount sufficient to cause the composition to permanently homogenize, said gel comprising a gelable colloid activated with an organic polar compound having at least one hydroxyl group.

2. A pigmented peroxide composition consisting essentially of a water-free mixture of: an organic peroxide, a pigment with which the active oxygen content in said peroxide remains substantially constant, and an activated gel in an amount sufficient to cause the composition to be permanently homogeneous, said gel comprising a detergent activated with an organic polar compound having at least one hydroxyl group.

3. A non-separating pigmented peroxide composition in approximate parts by weight, 50% benzoyl peroxide, 15% water, 25% plasticizer, and 10% detergent; and a pigment with which the active oxygen content of said peroxide remains substantially constant in an amount to impart a pre-selected amount of coloration to said composition.

4. A composition in accordance with claim 3 wherein said pigment constitutes about 5% to 10% by weight of the remaining components of said composition.

5. A composition in accordance with claim 3 wherein said detergent comprises a non-ionic surfactant and a salt of a long chain fatty acid.

6. A non-separating pigmented composition comprising, in approximate parts by weight, 55% benzoyl peroxide, 5% water, 30% plasticizer, and 10% detergent; and a pigment with which the active oxygen content of said peroxide remains substantially constant in an amount to impart a pre-selected amount of coloration to said composition.

7. A composition in accordance with claim 6 wherein said pigment constitutes about 5% to 10% by weight of the balance of the components of the composition.

8. A composition in accordance with claim 6 wherein said detergent comprises a non-ionic surfactant and a salt of a long chain fatty acid.

9. A pigmented peroxide composition adapted for use as a catalyst comprising an intermixture of:
   (a) an organic peroxide;
   (b) a pigment with which the active oxygen content of said peroxide remains substantially constant;
   (c) and an activated gel in an amount sufficient to cause the composition to be permanently homogeneous;
   (d) said gel comprising a silica gel containing a member of the group consisting of water and an organic polar compound having at least one hydroxyl group.

10. A permanently homogeneous pigmented peroxide composition adapted for use as a catalyst comprising an an intermixture of:
    (a) an organic peroxide;
    (b) a pigment with which the active oxygen content of said peroxide remains substantially constant;
    (c) and about 5–10% by weight of a silica gel containing about .001–.3% by weight of a member of the group selected from water and an organic polar compound having at least one hydroxyl group.

11. A pigmented peroxide composition comprising an intermixture of:
    (a) an organic peroxide;
    (b) a pigment with which the active oxygen content of said peroxide remains substantially constant;
    (c) an activated gel in an amount sufficient to cause the composition to be permanently homogeneous;
    (d) said gel comprising a silica gel containing water.

12. A pigmented peroxide composition comprising an intermixture of:
    (a) an organic peroxide;
    (b) a pigment with which the active oxygen content of said peroxide remains substantially constant;
    (c) an activated gel in an amount sufficient to cause the composition to be permanently homogeneous;
    (d) said gel comprising a silica gel containing an alkylene glycol.

13. A permanently homogeneous pigmented peroxide composition comprising an intermixture by weight of:
    (a) about 20–60% benzoyl peroxide and a pigment with which the active oxygen content of said peroxide remains substantially constant;
    (b) about 5–10% of a silica gel;
    (c) about .001–.3% of water;
    (d) and a plasticizer.

14. A permanently homogeneous pigmented peroxide composition comprising an intermixture by weight of:
    (a) about 20–60% benzoyl peroxide and a pigment with which the active oxygen content of said peroxide remains substantially constant;
    (b) about 5–10% of a silica gel;
    (c) about .001–.3% of an alkylene glycol;
    (d) and a plasticizer.

References Cited by the Examiner
UNITED STATES PATENTS

| 2,109,595 | 3/38 | Marks | 252—428 X |
| 2,319,142 | 5/43 | Lebach | 260—59 X |
| 2,505,039 | 4/50 | Gloor | 252—426 |
| 2,537,520 | 1/51 | Eger | 260—40 |
| 2,720,500 | 10/55 | Cody | 260—40 |
| 2,879,323 | 3/59 | Nichols et al. | 260—45.4 X |
| 2,895,919 | 7/59 | Gerhart | 252—430 |
| 2,916,481 | 12/59 | Gilmont | 260—610 |
| 3,016,361 | 1/62 | Schweiker et al. | 260—40 |
| 3,061,554 | 10/62 | Vartanian et al. | 252—426 |

FOREIGN PATENTS

| 1,130,802 | 2/57 | France. |
| 1,188,300 | 9/59 | France. |
| 797,442 | 6/58 | Great Britain. |

OTHER REFERENCES

"Plastics Eng. Handbook," 3rd. edition; Reinhold Pub. Corp., New York; copyright Jan. 28, 1960, pp. 219–220. (Copy in Sci. Lib.)

TOBIAS E. LEVOW, *Primary Examiner.*

JULIUS GREENWALD, *Examiner.*